July 6, 1965  J. K. W. BAINES  3,193,432
APPARATUS FOR FORMING TUBING FROM FLEXIBLE
RESILIENT STRIP MATERIAL
Filed March 27, 1963  2 Sheets-Sheet 1
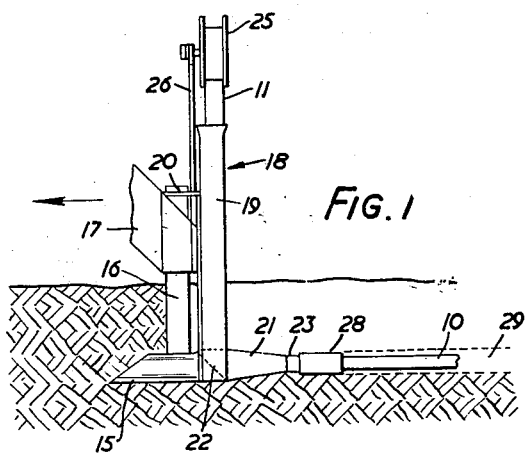
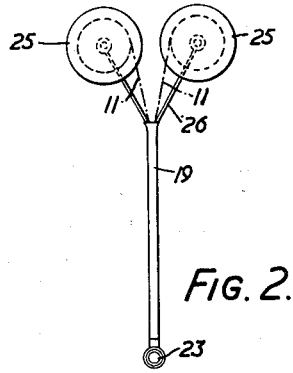
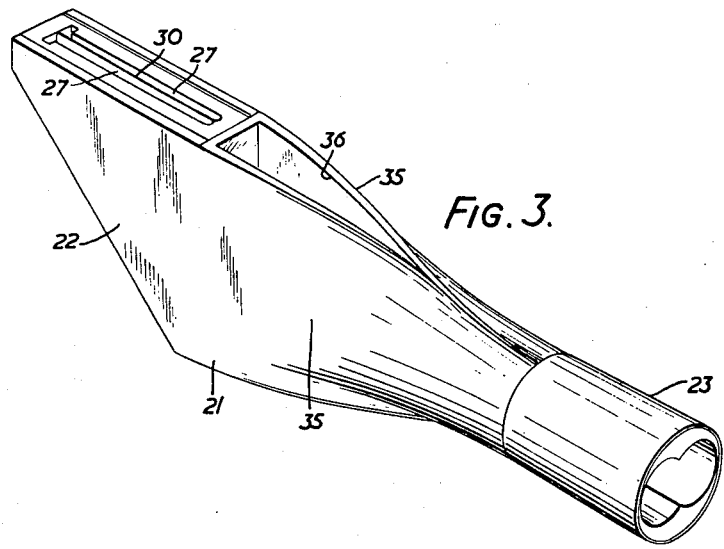
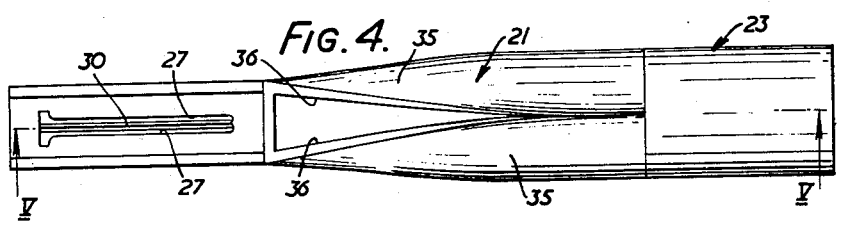
INVENTOR
JOHN K. W. BAINES
BY
Watson, Cole, Grindle & Watson
ATTORNEYS July 6, 1965    J. K. W. BAINES    3,193,432
APPARATUS FOR FORMING TUBING FROM FLEXIBLE
RESILIENT STRIP MATERIAL
Filed March 27, 1963    2 Sheets-Sheet 2
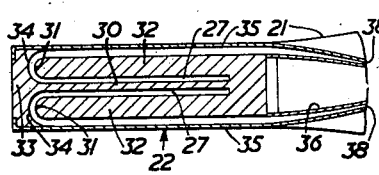
FIG. 6.
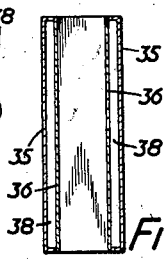
FIG. 7.
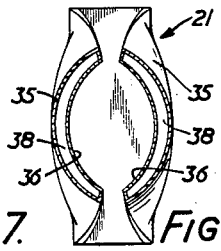
FIG. 8.
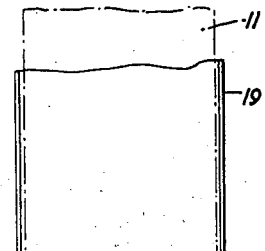
FIG. 9.
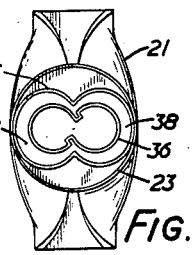
FIG. 10.
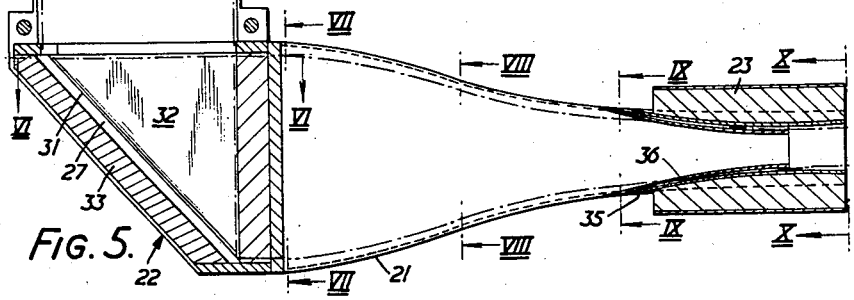
FIG. 5.
FIG. 11.
INVENTOR
JOHN K. W. BAINES
BY
Watson, Cole, Grindle & Watson
ATTORNEYS

United States Patent Office 3,193,432
Patented July 6, 1965

3,193,432
APPARATUS FOR FORMING TUBING FROM FLEXIBLE RESILIENT STRIP MATERIAL
John Kenneth Wadsworth Baines, Gidea Park, England, assignor of two-thirds to Alex Sabin Baines, Romford, England, and Thomas Bryan Creasy Davis, Gidea Park, England, jointly
Filed Mar. 27, 1963, Ser. No. 268,271
Claims priority, application Great Britain, Mar. 30, 1962, 12,381/62
6 Claims. (Cl. 156—467)

This invention relates to apparatus for forming tube from flexible resilient strip material by knitting together the longitudinal edges of two lengths of the strip, each formed along one longitudinal edge with a row of tabs and along the other edge with a row of recesses with which the tabs of the other strip can be interlocked so as to knit the curled strips together to form a longitudinally-seamed tube.

The invention is concerned with such apparatus of the kind (referred to herein as "the kind specified") which comprises a feeder conduit having a downwardly extending upper portion of flattened blade-like form and a lower portion joined at one end to the lower end of the upper portion and extending therefrom at an angle of inclination in the region of 90° thereto, the lower portion of the conduit carrying at its rear end a tube former through which the curled strips are passed longitudinally to cause their edges to become interlocked to form a tube. In use, the apparatus may be mounted behind a mole plough carried by a vehicle such as a tractor by which the mole is forced through the ground to form an underground tunnel, the lower part of the feeder conduit extending rearwardly in the tunnel behind the mole and the strip being fed continuously down through the upper part of the feeder conduit from a supply above ground level and being pulled through the tube former as the apparatus advances so as to form progressively a continuous length of tubing and lay it in situ in the tunnel.

According to the present invention, tube-forming apparatus of the kind specified is characterized by the feature that the feeder conduit affords two separate passages respectively adapted to receive the two strips, the passages extending separately and continuously in side-by-side relation from the upper end of the upper portion of the conduit to the tube former at the rear end of the lower portion of the conduit, each passage being of flattened form throughout the upper portion of the conduit but becoming progressively increasingly transversely curled between the leading and rear ends of the generally-horizontal lower portion of the feeder conduit.

Each of the two separate passages may be formed with an inclined fold at the junction of the two portions of the feeder conduit by which fold the direction of the passage is changed correspondingly, the outer side wall of the passage at the fold constituting a smoothly-rounded concave guide surface situated at the foot of the upper portion of the conduit to guide the strip around the fold.

Such an arrangement is entirely self-threading, in that each strip can be pushed longitudinally down through the open mouth of its associated passage, and its leading end will be guided around the fold by the outer guide surface referred to and will be led along the lower conduit portion and progressively curled therein until it enters directly into the tube former. Thus it is not necessary to dismantle the feeder conduit in order to feed new lengths of strip around the corner at its foot and into the tube former in preparation for laying a new length of tube.

Conveniently however the upper and lower portions of the feeder conduit may be separately formed and joined together by a detachable corner box affording the fold portions of the two passages.

The part of each of the passages which extends in the generally horizontal lower portion of the feeder conduit to the former die is preferably of C shaped cross section which is symmetrical with respect to the longitudinal axis of the passage, the degree of curvature of the cross-section increasing progressively towards the former die.

Moreover, the longitudinal axis of those parts of the passages which extend through the rear part at least of the lower portion of the feeder conduit, may lie in spaced planes which are both parallel to the general plane of the upper part of the feeder conduit, the said axes being nearly parallel to one another in their respective planes. The former die itself may afford a continuation of both passages in its leading end, wherein the two passages intersect one another obliquely at their edges to afford the interlocking of the tabs and their two strips.

The invention may be carried into practice in various ways, but one specific embodiment will now be described by way of example only with reference to the accompanying drawings, in which FIGURE 1 is a side view of a mole plough to which a drainage tube forming and laying apparatus is attached, FIGURE 2 is a rear view of the apparatus of FIGURE 1, FIGURE 3 is a perspective view on a larger scale of the lower part of the feeder conduit, corner box and former die of the tube forming apparatus, detached from the upper part, FIGURE 4 is a plan view of the parts shown in FIGURE 3, FIGURE 5 is a sectional side view of the parts shown in FIGURES 3 and 4, taken on the line V—V of FIGURE 4, FIGURE 6 is a fragmentary plan view in section on the line VI—VI of FIGURE 5, FIGURES 7 to 10 are respectively cross-sections on the lines VII—VII, VIII—VIII, IX—IX and X—X of FIGURE 6, and FIGURE 11 is a side view of a short length of plastic strip for use in forming the drainage tube.

In the illustrated embodiment, the invention is applied to an apparatus for forming and laying in situ continuous underground drainage pipe shown at 10 in FIGURE 1 made of two lengths of resiliently flexible plastic strip material 11 of the pattern illustrated in FIGURE 11, the strip 11 having along one edge a row of spaced protruding tabs 12 and along the other edge a row of correspondingly spaced slots 13 which are exactly in register with the tabs 12. The two lengths of strip 11 are knitted together underground by the introduction of the tabs 12 of one strip into the slots 13 of the other strip to interlock the edges of the two strips together and so to form a tube 10 having longitudinal seams.

As shown generally in FIGURE 1, the apparatus comprises a mole plough whose mole 15 is mounted at the foot of a blade-shaped coulter 16 which is supported by means of a hitch post 17 on the rear of a towing vehicle such as a tractor (not shown). Mounted behind the mole plough is a tube-forming device comprising a generally L-shaped feeder conduit 18 having a vertical portion 19 of flattened blade-like form which is attached to the coulter 16 by means of fastening means 20, and a horizontal lower portion 21 attached by means of a corner box 22 and carrying a former die 23 at its rear end.

The two strips 11 are coiled on reels 25 which are pivotally mounted on the arms of a Y-shaped frame 26 above the top of the feeder conduit 18, and are led down flat side-by-side through two passages 27 which extend throughout the feeder conduit to the former die 23, in which the transversely curled strips are caused to converge one upon another to interlock their edges and so form the tube 10. The newly formed tube 10 emerges from the rear of the former die 23 through the bore of a rear sleeve 28 into the earth tunnel 29 formed underground by the mole 15 as the mole plough is dragged through the soil, the lower part 21 of the feeder conduit being located directly behind the mole 15 in the earth tunnel 29.

The parts of the two passages which extend down through the vertical part 19 of the feeder conduit are flat and straight and are separated from one another by a thin partition wall 30. The passages 27 are slightly wider than the strips 11 and are dimensioned to maintain the latter flat as they descend side-by-side through the vertical part 19 of the feeder conduit to the corner box 22. In the triangular-sided corner box 22 the passages 27 are both swept through an angle of 90° by being folded outwardly around smoothly curved fold surfaces 31 inclined at 45° to the vertical. These inclined fold surfaces 31 are provided along the hypotenuses of a pair of thick triangular plates 32 spaced apart one on either side of the central partition wall 30. An inclined trough member 33 formed with two spaced parallel guide troughs 34 of circular section is mounted along the inclined side of the corner box and is spaced from the plates 32, the two guide troughs 34 cooperating with the two fold surfaces 31 which are spaced radially within them to form the fold portions of the two passages 27. From the inclined fold portions the two passages extend horizontally rearwardly past the outsides of the two thick plates 32, the outer walls of these parts of the passages be formed by a pair of spaced metal sheets 35 whose leading ends constitute the sides of the corner box 22 and which extend rearwardly to constitute the exterior of the lower horizontal portion 21 of the feeder conduit. Inner metal sheets 36 are secured inside the sheets 35 to define respectively between them the inner sides of the passages 27 beyond the corner box, so that the horizontal lower part of the feeder conduit consists of a pair of sheet metal ducts indicated at 38 and leading to the former die 23. It will be seen that each of the two ducts 38 is progressively curled transversely around its longitudinal axis to an increasing extent between the corner box 22 where they are flat and the former die 23 where they are C-sectioned. The two edges of the curled ducts 38 are brought progressively closer to one another as the ducts are increasingly curled until they meet just before the entrance to the former die, as indicated in FIGURE 9.

Thus the end of a length of plastic strip 11 of the pattern indicated in FIGURE 11 can be fed from its reel 25 into the open mouth of one of the passages 27 at the top of the vertical portion 19 of the feeder conduit and can be pushed down the passage 27 from above until its lower end enters the corner box. Further downward pushing of the strip causes its lower end to be deflected by the associated guide surface 34 of the inclined guide trough 33 around the inclined fold surface 31 of the thick plate 32 and to emerge in the horizontal direction from the corner box into the associated duct 38. The strip is pushed from above further into the vertical part 19 of the feeder conduit to cause its lower end to travel along the duct 38, being progressively curled thereby as it advances, until eventually it enters the former die 23. A second strip 11 can similarly be pushed down the vertical portion 19 in the other passage 27, around the corner box 22 and along the other curled duct 38 into the former die 23. The ends of the two strips within the former die can then be engaged by a hook member inserted through the rear end of the former die and the strips can be pulled further thereby to cause their edges in the former die to become knitted together and interlocked into tubular form and the interlocked ends of the strips to protrude beyond the rear end of the former die. Thus the apparatus is completely self-threading, in the sense that two new strips can be push-threaded through the passages 27 extending throughout the L-shaped feeder conduit 18 and then pulled through the former die 23, without the necessity of dismantling the feeder conduit to thread the strips around the right-angle corner at its foot or to introduce the strips into the former die.

It will be observed from FIGURES 7 to 10 that the progressively curling of each duct 38 takes place completely symmetrically about the longitudinal axis of the duct, and moreover that the longitudinal axes of the ducts do not converge on one another towards the former die but remain in the same parallel vertical planes. It will also be observed that there is a slight divergence of the longitudinal axes of the two ducts away from one another in these vertical planes so that when the ducts have reached the degree of curvature indicated in FIGURE 9 the opposed edges of the two ducts have come into engagement with one another in slightly staggered relationship, although the cross-section of each duct remains quite symmetrical about the longitudinal axis. This degree of staggering is sufficient to bring the outer ends of the tabs 12 of a strip 11 in one duct into alignment with the recesses 13 of the other strip 11 in the other passage as the two strips enter the former die 23, in readiness for the interlocking operation.

The former die 23 comprises a metal cylinder having a shaped double-C-section bore into which the ends of the metal sheaths 35 and 36 defining the ducts 38 are introduced so that the ducts 38 are extended within the former die. The progressive curling of each duct is continued within the former die until the edges of the two ducts actually intersect and merge and the merging of one duct is carried through that of the other in a staggered disposition as indicated in FIGURE 10, at which stage the inner metal sheaths 36 terminate but the other sheaths 35 are continued to the rear end of the former die. Thus as the two strips 11 are progressively advanced through the former die 23 the tabs 12 of one strip will be progressively introduced inwardly into the co-operating slots 13 of the adjacent edge of the other strip and thereby interlock the strips together. As the interlocked strips emerge from the rear end of the former die they will tend to expand under their own resilience into the form of a substantially cylindrical tube having two longitudinal seams, the tabs 12 projecting through the recesses 13 and lying against the inside surface of the tube.

It will be appreciated that because the two strips are progressively curled symmetrically about their longitudinal axes, two edges of each strip always being curled over to the same extent, the seams formed by the interlocking of the co-operating tabs and recesses will be straight seams extending parallel to the axis of the newly formed tube and not helical seams extending around the tube. This is a very important feature, because if the two strips were asymmetrically curled in the former die to form a continuous tube with helical seams, the rear end of the tube being anchored in the soil to draw the tube through the former die as the apparatus was progressively advanced, then the tube would be progressively "wound up" around its longitudinal axis as the apparatus advanced further and further by virtue of the rotational effect of the helical seams being opposed by the anchorage at the tube end. Eventually this "winding up" would reach a stage at which the tube would collapse. Hence the length of tube which could be laid continuously without such collapsing would be strictly limited, in dependence on the helix angle of the seams and on the resilience of the strips. This difficulty of "winding-up" does not occur with tubes produced by means of the present apparatus, as the seams are formed straight.

FIGURE 11 shows the preferred pattern of resilient plastic strip 11 for use with the apparatus of FIGURES 1 to 10. The strip itself is 4 inches in overall width and is made from the high-impact-strength polyvinyl chloride strip material known by the registered trade mark Vybak. The pattern of co-operating tabs 12 and slots 13 shown in FIGURE 11 is the subject of the present applicant's copending U.S. patent application Serial No. 268,316 filed March 23, 1963, and, briefly, comprises a row of spaced protruding tabs 12 each having a head of elongated form 1 3/32 inches long, as measured in the direction of the strip length, and secured to the body of the strip 11 by means of a neck 27/32 inch wide measured in the same direction. The head of each tab thus has a pair of lateral ears 43. The tabs 12 protrude 0.312 inch from the edge of the strip, and the pitch of the tabs is 1 15/16 inches. On the opposite margin of the strip 11 are formed the slots 13 which are exactly in register with the tabs 12 and are spaced apart at the same pitch. Each slot is of stepped form being 1 1/4 inches long at its inner edge 41 but only 15/16 inch long at its outer edge 42, and being formed with a small right-angle step 40 at each end as shown. In addition each slot 13 is provided with a tongue 13a formed integrally with its outer longitudinal edge 42 and protruding inwardly across substantially the whole width of the slot to its inner edge, from which the tongue is separated. The purpose of these tongues 13a is to assist in guiding the tabs 12 of the co-operating strip towards the longer, inner edges 41 of the slots during the introduction of the tabs into the slots, and to cause the slight arching of the tabs 12 to facilitate their passage through the slots and to increase the positiveness of the latched interconnection between the tabs and the slots, as described in further detail in the aforesaid application Serial No. 268,316.

As the head of each tab 12 is inserted into one of the slots 13 the tongue 13a deflects the tab towards the inner edge 41 of the slot and also arches the head slightly which facilitates introduction and curls back the two ears 43 so that the ears cross the ends of the slot 13 behind the steps 40. When the curled strip is released from the tube-forming apparatus it tends to expand radially, thus drawing back the head of the tab so that its neck is against the shorter edge 42 of the slot with the two ears 43 positively engaged behind the steps 40.

In use, the apparatus of FIGURES 1 to 10 is threaded up with two strips 11 from the reels 25 by pushing the strips down the continuous passages 27 of the feeder conduit 18 and into the former die 23 and then drawing the strips through the former die from the rear by means of a hook, as described above, until a short length of tube formed by the interlocking of the edges of the two strips protrudes from the rear of the former die 23 beyond the sleeve 28. The mole is then introduced into the ground, for example by lowering the whole mole plough with the tube-forming apparatus into a ditch at the side of a field to be drained, and forcing the mole into the ground through the side of the ditch to start the formation of an underground passage in the direction and at the depth of the required drain. The protruding rear end of the newly-formed tube is anchored at the mouth of the underground tunnel, and the mole plough is then advanced through the soil by means of the tractor to form a continuous underground tunnel and simultaneously to draw the two strips 11 from the reels through the feeder conduit 18 so that they are interlocked by their passage through the former die 23 and emerge as a continuous length of longitudinally-seamed plastic drainage tube in the tunnel just formed by the mole. During the forward movement of the apparatus, the vertical upper portion 19 of the feeder conduit travels in the vertical slit formed in the soil by the mole plough coulter 16. The purpose of the rearwardly protruding sleeve 28 is to protect the newly formed tube emerging from the former die from being subjected to soil loads until it has emerged sufficiently from the die to take up a substantially cylindrical disposition under its own resilience. The sleeve 28 has been omitted from FIGURES 3, 4 and 5 for the sake of clarity but is shown clearly in FIGURE 1. Once the tube has adopted its expanded cylindrical shape, it is much better able to stand up to the loads produced by the surrounding soil without collapsing.

It will be understood that whilst in the specific embodiment illustrated the use of a strip pattern according to FIGURE 11 has been described, the apparatus of FIGURES 1 to 10 can also be used with other patterns of tabbed and recessed strips, provided that the tab and recess profiles are such as to provide an adequately interlocked seam and provided that the tabs and recesses on opposite sides of each strip are precisely in register with one another so as to avoid spiralling of the seams.

What I claim as my invention and desire to secure by Letters Patent is:

1. Tube forming apparatus of the kind specified for forming a tube from two lengths of flexible resilient strip material by causing each edge of one strip to engage with the adjacent edge of the other strip, one of each adjacent pair of engaging edges being provided with recesses and the other edge of the pair being provided with tab formations to engage in said recesses, characterised in that the feeder conduit forms two separate continuous passages respectively adapted to receive the two strips, the passages extending separately and continuously in side-by-side relationship from the upper end of the upper portion of the conduit to the tube former at the rear end of the lower portion of the conduit, and each passage being of flattened form throughout the upper portion of the conduit but becoming progressively increasingly transversely curled towards the other passage between the leading and rear ends of the generally horizontal lower portion of the conduit.

2. Apparatus as claimed in claim 1 in which each passage is formed with an inclined fold at the junction of the two portions of the feeder conduit by which fold the direction of the passage is changed correspondingly, the outer side wall of each passage at the fold constituting a smoothly rounded concave guide surface situated at the foot of the upper portion of the conduit to guide the strip around the fold.

3. Apparatus as claimed in claim 2 in which the upper and lower portions of the feeder conduit are separately formed and are joined together by a detachable corner box forming the fold portions of the two passages.

4. Apparatus as claimed in claim 1 in which the part of each passage extending in the lower portion of the feeder conduit to the former die is of C-shaped cross-section which is symmetrical with respect to the longitudinal axis of the passage, the degree of curvature of the cross-section increasing progressively towards the former die.

5. Apparatus as claimed in claim 4 in which the longitudinal axes of those parts of the two passages which lie in the rear part at least of the lower portion of the feeder conduit, lie in spaced planes which are both parallel to the general plane of the upper part of the feeder conduit, the said axes being nearly parallel to one another in their respective planes, whereby one edge of each passage meets obliquely the outer side face of the margin of the other passage at a point adjacent to the entrance to the former die.

6. Apparatus as claimed in claim 5 in which the former die forms a continuation of both passages in its leading end wherein the two passages intersect one another obliquely at their edges, and forms a continuation of the outer surfaces only of the two intersected passages in its rear edge.

References Cited by the Examiner

UNITED STATES PATENTS

| 2,502,012 | 3/50 | Kinkead | 113—33 |
| 2,663,072 | 12/53 | Pfistershammer | 113—33 XR |
| 2,912,043 | 11/59 | Bargholtz et al. | 156—466 XR |

EARL M. BERGERT, *Primary Examiner.*